T. J. CARR.
SHIP'S DAVIT.
APPLICATION FILED MAY 5, 1921.
1,422,175.
Patented July 11, 1922.
3 SHEETS—SHEET 1.
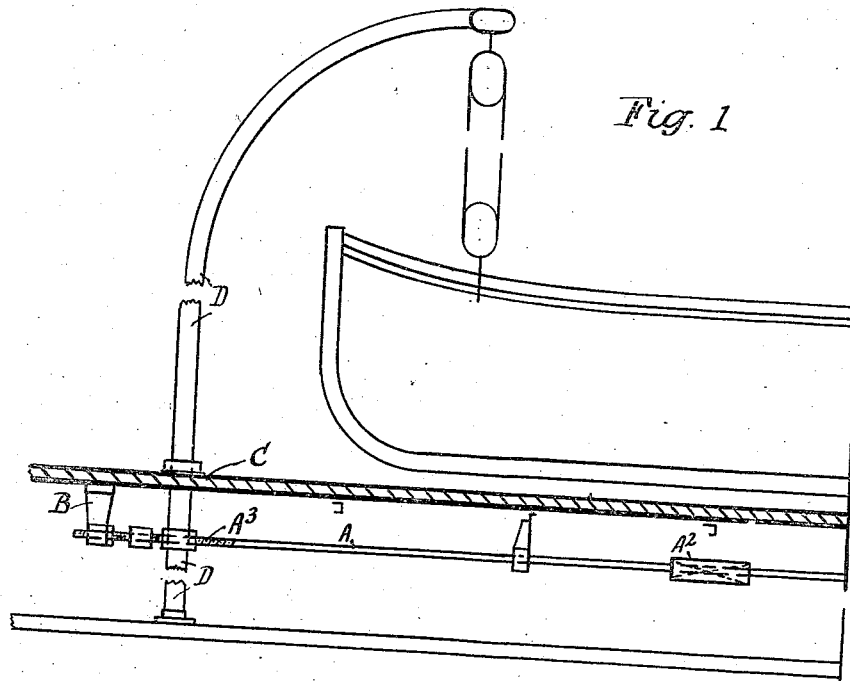
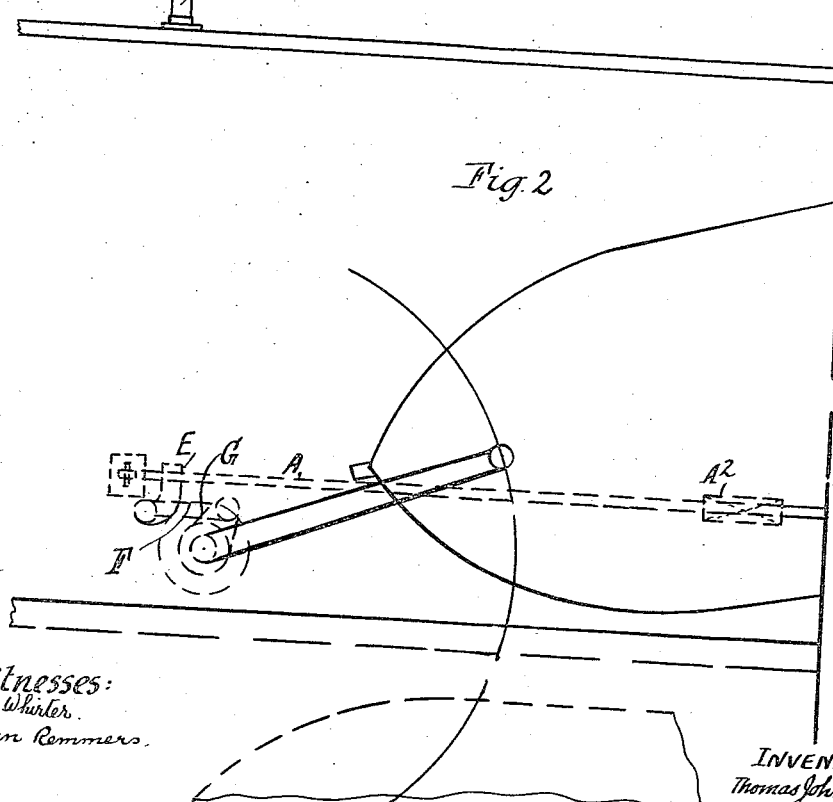

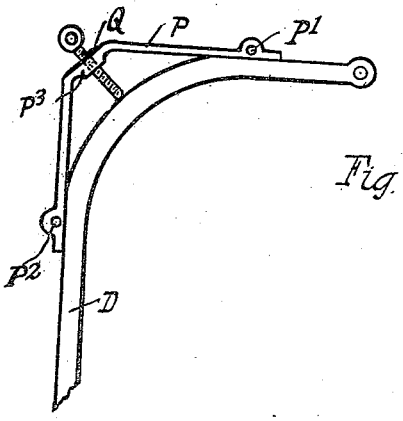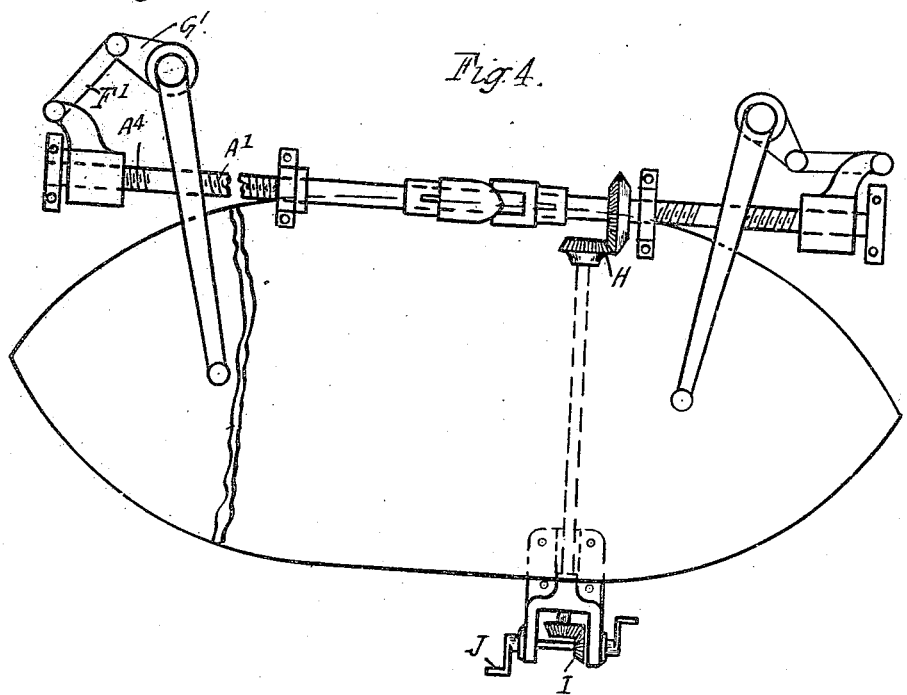

UNITED STATES PATENT OFFICE.

THOMAS JOHN CARR, OF NEWCASTLE-UPON-TYNE, ENGLAND.

SHIP'S DAVIT.

1,422,175.	Specification of Letters Patent.	Patented July 11, 1922.

Application filed May 5, 1921. Serial No. 466,990.

*To all whom it may concern:*

Be it known that I, THOMAS JOHN CARR, a subject of the King of England, residing at Newcastle-upon-Tyne, England, have invented new and useful Improvements Relating to Ships' Davits, of which the following is a specification.

This invention relates to means for operating co-acting ships' davits of the kind in which the davits, unconnected by rod or spar, receive a differential movement and its object is to provide a screw-threaded shaft carrying screw-threaded sliding members each joined by links to a crank on the corresponding davit in such a manner that the linear motion of said sliding members produce differential rotary movements of the davits, while suitable operating gear is provided for rotating the said screw-threaded shaft.

The unconnected co-acting davits may be rotated or turned inboard and outboard by a single straight shaft or by co-acting angularly disposed shafts.

In adopting a single straight shaft, two portions thereof are screw-threaded with right hand and left hand threads along suitable lengths to carry appropriate sliding nuts, arranged in guides if desired, or sleeves with trunnion pins, studs or lugs to engage in or with links pin-jointed to a crank-arm fast on the corresponding davit; said shaft may be in two aligned parts joined by clutch, or flexible coupling devices so that each shaft portion can be rotated separately or consecutively, or both simultaneously according to requirements; mitre gear controlled by a crank handle may be adopted for rotating the shaft.

Figure 1A:
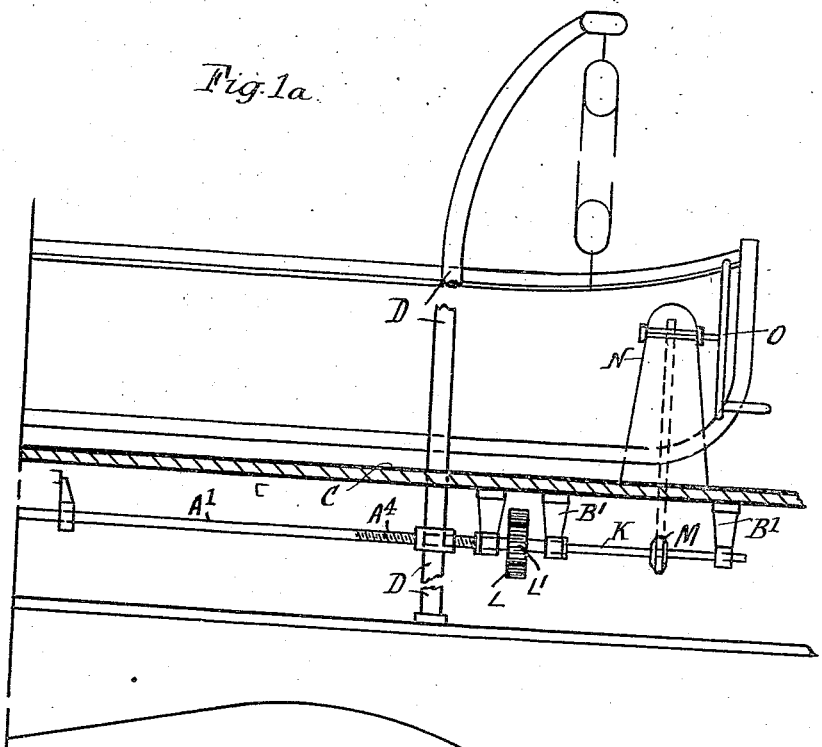
Figure 2A:
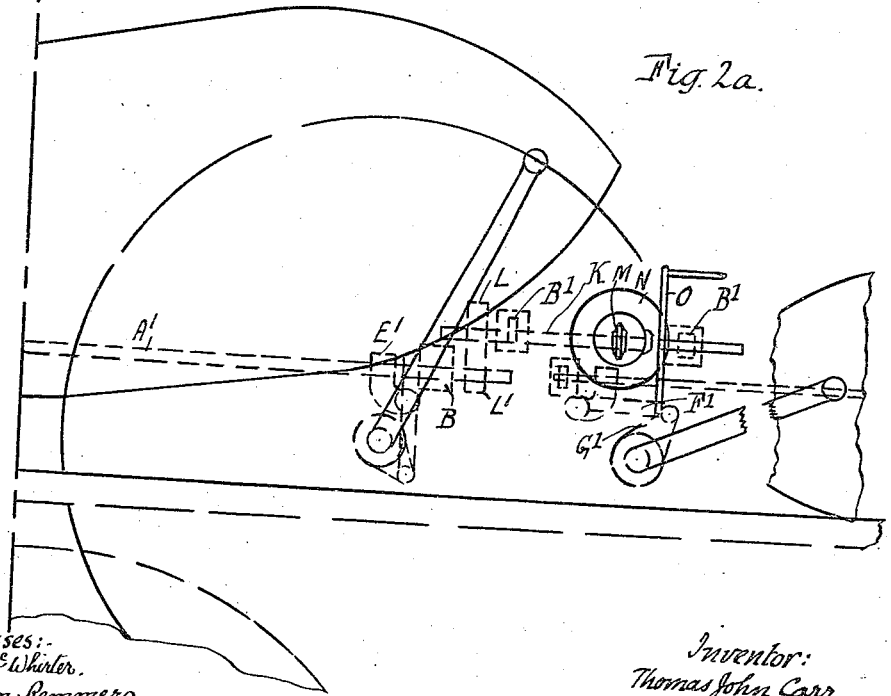

My invention will be fully described with reference to the accompanying drawings, in which:

Figure 1—1ª is a side elevation showing the invention applied; Fig. 2—2ª is a corresponding plan; Figs. 3 and 4 are opposite end portions of the operating gear drawn to a larger scale; Fig. 5 is a side view of a detail hereinafter described.

A straight shaft, preferably made in two parts A and $A^1$ jointed by a flexible coupling $A^2$, is carried in the hangers B fast below deck which latter is marked C. The shaft is mounted conveniently near the downward extensions of the davits D and in proximity of these it has screw-threaded portions $A^3$ and $A^4$ of right and left hand threads in suitable lengths to carry sliding nuts E, $E^1$, or any mechanical equivalent, which by links F, $F^1$ are pin-jointed to crank-arms G, $G^1$ on the corresponding davits. The sliding nuts may be arranged in guides which can serve to support the screwed portions and prevent any bending.

A divided shaft, instead of a single-length shaft, permits of rotating each shaft portion separately or consecutively should this be necessary. Further, the screw-portions of the shaft may be of different pitch if desired. A base plate may be provided arranged to embrace both davits in order to keep their relative positions constant when the operating gear is fitted to wood-decks. Roller or ball bearings may be or are provided where desired.

Or I may provide two separate angularly disposed shafts having screw-threaded portions connected at the apex of the angle by angle wheels, while suitably disposed crank-operated driving gear will be provided in connection therewith. Fig. 3 shows mitre gears H and I controlled by crank-handles J for rotating a straight shaft.

I may, however, use the driving gear shown in Figs. 1—1ª and 2—2ª, consisting in a lay-shaft K mounted in bearings $B^1$ and operating the main shaft A, $A^1$ through the intervention of spur wheels L, $L^1$. A chain drive M leads from the lay-shaft through a hollow standard N fitted with turning gear O on deck. Any other form of driving gear is applicable.

Obviously the shaft may be in two or three parts connected together by flexible couplings and the gear may be on top or below deck as desired.

For strengthening or stiffening davits at the curved portion or neck, a rod P suitably bent has its extremities $P^1$, $P^2$ fast on the outside of the davit so as to ride on the curved portion or neck thereof, while in a lug $P^3$ at the middle of the rod a screw pin Q is so engaged as to press against the curved back of the davit and thereby tend to straighten same and counteract any tendency of collapsing under heavy load.

Disengaging may be obtained by removing a suitably arranged pin which connects the crank arm to the links in each davit and swinging the links back clear, the davits will then be rendered independent as they were, and workable in the usual way.

Claim:

In mutually operated ships' davits, a screw-threaded shaft, screw-threaded sliding members carried thereon, a link joined to each of said members, and a crank pin-jointed to the corresponding link and fast on each davit at a different angle so that the linear motion of said sliding members produces differential rotary movement of the davits, and operating gear for said screw-threaded shaft.

THOMAS JOHN CARR.